United States Patent
Levings et al.

(10) Patent No.: US 10,209,015 B2
(45) Date of Patent: Feb. 19, 2019

(54) HEAT EXCHANGER AND METHOD FOR MAKING

(75) Inventors: Natalie B. Levings, Palm Beach Gardens, FL (US); Nicholas J. Nagurny, Manassas, VA (US); Michael R. Eller, New Orleans, LA (US)

(73) Assignee: Lockheed Martin Corporation, Bethesda, MD (US)

( * ) Notice: Subject to any disclaimer, the term of this patent is extended or adjusted under 35 U.S.C. 154(b) by 822 days.

(21) Appl. No.: 12/838,114

(22) Filed: Jul. 16, 2010

(65) Prior Publication Data

US 2011/0011570 A1 Jan. 20, 2011

Related U.S. Application Data

(60) Provisional application No. 61/226,487, filed on Jul. 17, 2009.

(51) Int. Cl.
 *F28F 19/00* (2006.01)
 *F28F 9/02* (2006.01)
 (Continued)

(52) U.S. Cl.
 CPC .............. *F28F 9/18* (2013.01); *F28D 7/1684* (2013.01); *F28D 9/0081* (2013.01); *F28F 3/025* (2013.01);
 (Continued)

(58) Field of Classification Search
 CPC ...... F28F 2275/04; F28F 2275/06; F28F 9/18; F28F 3/025; F28D 9/0062; F28D 7/1684; F28D 9/0081
 (Continued)

(56) References Cited

U.S. PATENT DOCUMENTS 1,622,664 A 3/1927 Murray et al.
2,040,947 A 5/1936 Mojonnier et al.
(Continued)

FOREIGN PATENT DOCUMENTS

CN 1333868 A 1/2002
CN 2821508 Y 9/2006
(Continued)

OTHER PUBLICATIONS

Novakovic, Zoran, "CA Application No. 2,766,917 Examiner's Report dated Mar. 26, 2012"Publisher: CIPO, Published in: CA.
(Continued)

*Primary Examiner* — Jason Thompson
(74) *Attorney, Agent, or Firm* — Withrow & Terranova, PLLC

(57) ABSTRACT

A hybrid plate-fin heat exchanger for exchanging heat between a first fluid and a second fluid is disclosed. The hybrid plate-fin heat exchanger comprises a plurality of plates, each of which comprises channels for conveying the first fluid. Fins are brazed onto each plate, wherein the fins define a plurality of flow channels for the second fluid. The plates are joined to one another via friction-stir welding in such a way that the brazed regions are fluidically isolated from the first fluid during operation. As a result, the heat exchanger is suitable for use in applications that use a first fluid, such as seawater or geothermal fluid, which is corrosive for the brazed regions.

17 Claims, 10 Drawing Sheets

(51) Int. Cl.
- *F28F 3/00* (2006.01)
- *F28F 9/18* (2006.01)
- *F28D 7/16* (2006.01)
- *F28F 3/02* (2006.01)
- *F28D 9/00* (2006.01)
- *F28F 21/08* (2006.01)
- *F28F 9/22* (2006.01)

(52) U.S. Cl.
CPC ............ *F28D 9/0062* (2013.01); *F28F 19/00* (2013.01); *F28F 21/08* (2013.01); *F28F 2009/226* (2013.01); *F28F 2275/04* (2013.01); *F28F 2275/062* (2013.01); *Y02E 10/34* (2013.01); *Y10T 29/4935* (2015.01)

(58) Field of Classification Search
USPC ...................... 165/134.1, 159, 158, 140, 157
See application file for complete search history.

(56) References Cited

U.S. PATENT DOCUMENTS

| | | |
|---|---|---|
| 2,071,277 A | 2/1937 | Barclay et al. |
| 2,083,028 A | 6/1937 | Livar |
| 2,184,759 A * | 12/1939 | Shipman .............. F24F 3/1417 165/157 |
| 2,229,554 A | 1/1941 | Cummings |
| 2,347,957 A | 5/1944 | McCullough |
| 2,424,265 A | 7/1947 | Allen |
| 2,540,339 A | 2/1951 | Kritzer |
| 2,653,211 A * | 9/1953 | Andrus ..................... 219/137 R |
| 2,938,712 A | 5/1960 | Pellmyr |
| 2,995,343 A | 8/1961 | Gardner et al. |
| 3,294,162 A | 12/1966 | Loehlein et al. |
| 3,460,611 A | 8/1969 | Folsom et al. |
| 3,476,179 A | 11/1969 | Meister et al. |
| 3,595,310 A | 7/1971 | Burne et al. |
| 3,761,384 A * | 9/1973 | Ruthel et al. ........... C25B 11/02 204/288 |
| 3,805,515 A | 4/1974 | Zener |
| 3,807,494 A | 4/1974 | Ris |
| 3,825,061 A * | 7/1974 | Bathla .............................. 165/70 |
| 3,881,547 A | 5/1975 | Lavering |
| 3,907,032 A * | 9/1975 | DeGroote ........... F28D 1/05366 165/143 |
| 4,055,145 A | 10/1977 | Mager et al. |
| 4,095,646 A * | 6/1978 | Granetzke ....................... 165/77 |
| 4,098,329 A | 7/1978 | Culver |
| 4,099,928 A | 7/1978 | Norback |
| 4,103,647 A | 8/1978 | Dörling et al. |
| 4,149,591 A | 4/1979 | Albertsen |
| 4,150,719 A | 4/1979 | Thielen et al. |
| 4,253,516 A | 3/1981 | Giardina |
| 4,276,927 A * | 7/1981 | Foust ............................... 165/70 |
| 4,294,564 A | 10/1981 | Person et al. |
| 4,323,114 A | 4/1982 | Corey |
| 4,350,014 A | 9/1982 | Sanchez et al. |
| 4,355,684 A | 10/1982 | Caines |
| 4,401,155 A | 8/1983 | Royal et al. |
| 4,432,307 A | 2/1984 | Godin |
| 4,478,277 A | 10/1984 | Friedman et al. |
| 4,501,321 A * | 2/1985 | Real ..................... F28D 9/0031 138/157 |
| 4,592,416 A | 6/1986 | Mattison et al. |
| 4,625,794 A | 12/1986 | Dürst |
| 4,633,819 A | 1/1987 | Tilliette |
| 4,688,631 A | 8/1987 | Peze et al. |
| 4,693,304 A | 9/1987 | Volland |
| 4,729,427 A | 3/1988 | Baumann |
| 4,729,428 A | 3/1988 | Yasutake et al. |
| 4,738,309 A | 4/1988 | Schilling |
| 4,753,773 A | 6/1988 | Garabedian et al. |
| 4,782,571 A | 11/1988 | Krips et al. |
| 4,941,530 A | 7/1990 | Crowe |
| 5,042,572 A | 8/1991 | Dierbeck |
| 5,137,080 A | 8/1992 | Haasch et al. |
| 5,178,822 A | 1/1993 | Buford, III et al. |
| 5,285,843 A | 2/1994 | Dierbeck |
| 5,289,870 A | 3/1994 | Dierbeck |
| 5,303,770 A | 4/1994 | Dierbeck |
| 5,448,830 A | 9/1995 | Borchert et al. |
| 5,452,758 A | 9/1995 | Mauterer |
| 5,499,674 A | 3/1996 | Bartz et al. |
| 5,513,700 A | 5/1996 | Kleve et al. |
| 5,566,881 A | 10/1996 | Inoue et al. |
| 5,590,707 A | 1/1997 | Mauterer |
| 5,655,600 A * | 8/1997 | Dewar et al. ................. 165/166 |
| 5,775,412 A | 7/1998 | Montestruc, III et al. |
| 5,813,592 A | 9/1998 | Midling et al. |
| 5,988,266 A | 11/1999 | Smith et al. |
| 6,009,938 A | 1/2000 | Smith et al. |
| 6,035,928 A | 3/2000 | Ruppel et al. |
| 6,059,026 A | 5/2000 | Bailly et al. |
| 6,106,789 A | 8/2000 | Thompson et al. |
| 6,173,493 B1 | 1/2001 | Dierbeck |
| 6,390,185 B1 | 5/2002 | Proeschel |
| 6,516,874 B2 * | 2/2003 | Mathur ................. F28D 9/0037 165/166 |
| 6,637,109 B2 | 10/2003 | Nyqvist |
| 6,808,689 B1 | 10/2004 | Matsumoto et al. |
| 6,819,561 B2 | 11/2004 | Hartzell et al. |
| 6,901,660 B2 | 6/2005 | Miska |
| 6,945,322 B2 | 9/2005 | Ikeda |
| 6,983,788 B2 | 1/2006 | Haglid |
| 7,055,576 B2 | 6/2006 | Fernstrum |
| 7,165,605 B2 | 1/2007 | Park et al. |
| 7,191,824 B2 | 3/2007 | Wu et al. |
| 7,328,578 B1 | 2/2008 | Saucedo |
| 7,549,466 B2 | 6/2009 | Hayashi et al. |
| 7,726,388 B2 | 6/2010 | Toda |
| 7,921,558 B2 | 4/2011 | Beamer et al. |
| 7,926,558 B2 | 4/2011 | Hagberg |
| 7,967,060 B2 | 6/2011 | Trumbower et al. |
| 8,540,012 B2 | 9/2013 | Nagurny et al. |
| 9,388,798 B2 | 7/2016 | Levings et al. |
| 2002/0038702 A1 | 4/2002 | Font-Freide et al. |
| 2002/0153130 A1 | 10/2002 | Okamoto et al. |
| 2002/0162651 A1 * | 11/2002 | Nakagome ............ F28F 9/0229 165/158 |
| 2004/0149425 A1 * | 8/2004 | Abiko ................... F28D 9/0068 165/166 |
| 2005/0061485 A1 | 3/2005 | Hirafuji et al. |
| 2005/0103482 A1 | 5/2005 | Park et al. |
| 2005/0133567 A1 * | 6/2005 | Runyan ...................... 228/112.1 |
| 2005/0173103 A1 | 8/2005 | Dawson |
| 2006/0175051 A1 | 8/2006 | Kinoshita |
| 2007/0029070 A1 | 2/2007 | Yamamoto et al. |
| 2007/0131399 A1 * | 6/2007 | Digele .......................... 165/158 |
| 2007/0138237 A1 | 6/2007 | Nishikawa et al. |
| 2007/0261226 A1 * | 11/2007 | Deul .................. B23K 20/1225 29/525.13 |
| 2007/0284095 A1 | 12/2007 | Wang et al. |
| 2008/0029254 A1 | 2/2008 | Sekito et al. |
| 2008/0078536 A1 * | 4/2008 | Tolani ....................... 165/134.1 |
| 2008/0135219 A1 | 6/2008 | Doh et al. |
| 2008/0241615 A1 * | 10/2008 | Sugimasa et al. .............. 429/20 |
| 2009/0008066 A1 | 1/2009 | Meng et al. |
| 2009/0065178 A1 | 3/2009 | Kasezawa et al. |
| 2009/0140428 A1 * | 6/2009 | Bonilla ............. H01L 21/31144 257/751 |
| 2009/0159643 A1 | 6/2009 | Wimmer et al. |
| 2009/0229804 A1 | 9/2009 | Zebuhr |
| 2009/0294110 A1 * | 12/2009 | Foust ........................ F03G 7/05 165/152 |
| 2009/0308582 A1 * | 12/2009 | Nagurny ................ B21D 53/02 165/167 |
| 2011/0011572 A1 | 1/2011 | Nagurny et al. |
| 2011/0079375 A1 | 4/2011 | Nagurny et al. |
| 2011/0120126 A1 | 5/2011 | Srinivasan |
| 2011/0173978 A1 | 7/2011 | Rekret et al. |
| 2012/0011849 A1 | 1/2012 | Cole et al. |
| 2012/0073291 A1 | 3/2012 | Shapiro et al. |
| 2012/0080175 A1 | 4/2012 | Levings et al. |
| 2012/0199331 A1 | 8/2012 | Maurer et al. |

(56) References Cited

U.S. PATENT DOCUMENTS

| | | |
|---|---|---|
| 2013/0042612 A1 | 2/2013 | Shapiro et al. |
| 2013/0042613 A1 | 2/2013 | Ross et al. |
| 2013/0042996 A1 | 2/2013 | Hwang et al. |

FOREIGN PATENT DOCUMENTS

| | | |
|---|---|---|
| CN | 203443419 U | 2/2014 |
| DE | 2351529 A1 | 4/1975 |
| DE | 19624937 A1 | 1/1998 |
| DE | 102005058314 A1 | 6/2007 |
| DE | 102007021420 A1 | 11/2008 |
| EP | 0174554 A1 | 3/1986 |
| EP | 1033546 A2 | 9/2000 |
| EP | 2072938 A2 | 6/2009 |
| FR | 1374955 A | 10/1964 |
| FR | 1559076 A | 3/1969 |
| FR | 2510729 A1 | 2/1983 |
| GB | 969319 | 9/1964 |
| GB | 2424265 A | 9/2006 |
| JP | S5420690 B2 | 7/1979 |
| JP | 57018473 A | 1/1982 |
| JP | S58200995 A | 11/1983 |
| JP | S59212601 A | 12/1984 |
| JP | S60185091 A | 9/1985 |
| JP | S6131889 A | 2/1986 |
| JP | S61213493 A | 9/1986 |
| JP | S6288169 U | 6/1987 |
| JP | 62158996 A | 7/1987 |
| JP | S62158996 A | 7/1987 |
| JP | S62136770 U | 8/1987 |
| JP | S62233684 A | 10/1987 |
| JP | S6317961 U | 2/1988 |
| JP | 63169494 A | 7/1988 |
| JP | S6344708 Y2 | 11/1988 |
| JP | 02077469 A | 3/1990 |
| JP | 02084252 A | 3/1990 |
| JP | H04214191 A | 8/1992 |
| JP | H05308829 A | 11/1993 |
| JP | H05340342 A | 12/1993 |
| JP | 622017 U | 3/1994 |
| JP | H0645159 Y2 | 11/1994 |
| JP | H09210576 A | 8/1997 |
| JP | 10005681 A | 1/1998 |
| JP | 10339588 A | 12/1998 |
| JP | H1147960 A | 2/1999 |
| JP | H11503816 A | 3/1999 |
| JP | 11264691 A | 9/1999 |
| JP | 2000073164 A | 3/2000 |
| JP | 2001133195 A | 5/2001 |
| JP | 2002066720 A | 3/2002 |
| JP | 2003037386 A | 2/2003 |
| JP | 2004167334 A | 6/2004 |
| JP | 3102194 U | 7/2004 |
| JP | 2005194624 A | 7/2005 |
| JP | 2006026721 A | 2/2006 |
| JP | 2006205252 A | 8/2006 |
| JP | 2006207950 A | 8/2006 |
| JP | 2006-289481 A | 10/2006 |
| JP | 2006297437 A | 11/2006 |
| JP | 2006337000 A | 12/2006 |
| JP | 2007511735 A | 5/2007 |
| JP | 2007163073 A | 6/2007 |
| JP | 2008503047 A | 1/2008 |
| JP | 2008070026 A | 3/2008 |
| JP | 2008239451 A | 10/2008 |
| JP | 2009517625 A | 4/2009 |
| JP | 3178668 U | 9/2012 |
| KR | 10-2008-0076222 A | 8/2008 |
| WO | 9632618 A1 | 10/1996 |
| WO | 9749962 A1 | 12/1997 |
| WO | 0181849 A1 | 11/2001 |
| WO | 2006115073 A1 | 11/2006 |
| WO | 2009056446 A1 | 5/2009 |

OTHER PUBLICATIONS

Wittmann-Regis, Agnes, "PCT Application No. PCT/US2010/042333 International Preliminary Report on Patentability dated Feb. 9, 2012", , Publisher: PCT, Published in: PCT.

Bain, David, "PCT Application No. PCT/US2010/042333 International Search Report dated Jan. 25, 2012", , Publisher: PCT, Published in: PCT.

Santosh Gupta, "Related Australian Patent Application No. 2010273997 Examination Report", dated Nov. 16, 2012, Publisher: IP Australia, Published in: AU.

Restriction Requirement and Interview Summary for U.S. Appl. No. 12/836,688, dated Aug. 23, 2013, 11 pages.

Non-Final Office Action for U.S. Appl. No. 12/836,688, dated Nov. 6, 2013, 15 pages.

Non-Final Office Action for U.S. Appl. No. 12/836,688, dated Dec. 5, 2014, 14 pages.

Final Office Action for U.S. Appl. No. 12/836,688, dated Jun. 5, 2015, 14 pages.

Advisory Action and Applicant-Initiated Interview Summary for U.S. Appl. No. 12/836,688, dated Sep. 11, 2015, 6 pages.

Non-Final Office Action for U.S. Appl. No. 12/836,688, dated Dec. 14, 2015, 8 pages.

Applicant-Initiated Interview Summary for U.S. Appl. No. 12/836,688, dated Mar. 9, 2016, 4 pages.

Notice of Allowance for U.S. Appl. No. 12/836,688, dated Jun. 22, 2016, 8 pages.

Non-Final Office Action for U.S. Appl. No. 13/032,119, dated Aug. 16, 2013, 15 pages.

Non-Final Office Action for U.S. Appl. No. 13/032,119, dated Nov. 21, 2013, 19 pages.

Final Office Action for U.S. Appl. No. 13/032,119, dated Jan. 3, 2014, 14 pages.

Non-Final Office Action for U.S. Appl. No. 13/032,119, dated Dec. 4, 2014, 17 pages.

Final Office Action for U.S. Appl. No. 13/032,119, dated Mar. 26, 2015, 16 pages.

Advisory Action for U.S. Appl. No. 13/032,119, dated Jun. 30, 2015, 3 pages.

Non-Final Office Action for U.S. Appl. No. 13/032,119, dated Oct. 23, 2015, 15 pages.

Final Office Action for U.S. Appl. No. 13/032,119, dated Mar. 1, 2016, 20 pages.

Advisory Action for U.S. Appl. No. 13/032,119, dated May 10, 2016, 3 pages.

Non-Final Office Action for U.S. Appl. No. 13/032,119, dated Aug. 12, 2016, 27 pages.

Non-Final Office Action for U.S. Appl. No. 13/301,252, dated Jul. 11, 2014, 9 pages.

Final Office Action for U.S. Appl. No. 13/301,252, dated Sep. 8, 2014, 9 pages.

Non-Final Office Action for U.S. Appl. No. 13/301,252, dated Apr. 29, 2015, 11 pages.

Notice of Allowance for U.S. Appl. No. 13/301,252, dated Sep. 30, 2015, 10 pages.

"Related Australian Patent Application No. AU 2010 273997 Office Action", dated Oct. 4, 2013, Publisher: IP Australia, Published in: AU.

"Related Chinese Patent Application No. 2010 80032268.3 Office Action", dated Dec. 24, 2013, Publisher: CIPO, Published in: CN.

"Related Canadian Patent Application No. 2,766,917", "Office Action", dated Apr. 23, 2014, Publisher: Canadian Intellectual Property Office, Published in: CA.

"Related Japanese Patent Application No. 2012-520821", "Office Action", dated May 15, 2014, Publisher: JPO, Published in: JP.

"Related Canadian Patent Application No. 2,766,917 Office Action", dated Mar. 21, 2013, Publisher: CIPO, Published in: CA.

"Related Korean Patent Application No. 10-2012-7003687 Office Action", "KIPO", dated May 31, 2013, Published in: KR.

"Related Australian Patent Application No. 2010273997 Examination Report", dated Jul. 17, 2013, Publisher: IP Australia, Published in: AU.

(56) References Cited

OTHER PUBLICATIONS

Stone, K.M., "Review of Literature on Heat Transfer Enhancement in Compact Heat Exchangers," ACRC TR-105, Air Conditioning and Refrigeration Center, University of Illinois, Aug. 1996, 39 pages.
Yang, T. L. et al., "Forced Heat Convection of Wavy Fin Channel," Journal of Thermal Science and Technology, vol. 3, No. 2, 2008, pp. 342-354.
Patent Examination Report No. 1 for Australian Patent Application No. 2010273345, dated Nov. 1, 2012, 3 pages.
Patent Examination Report No. 1 for Australian Patent Application No. 2010-303747, dated Mar. 12, 2013, 3 pages.
Office Action for Canadian Patent Application No. 2,767,174, dated Jun. 3, 2013, 3 pages.
Office Action for Canadian Patent Application No. 2,767,174, dated Mar. 6, 2014, 2 pages.
Office Action for Canadian Patent Application No. 2,774,682, dated Sep. 9, 2013, 2 pages.
Second Office Action for Chinese Patent Application No. 201080031821.1, dated Nov. 15, 2013, 13 pages.
Second Office Action for Chinese Patent Application No. 201080032268.3, dated Oct. 24, 2014, 17 pages.
Third Office Action for Chinese Patent Application No. 201080032268.3, dated Nov. 23, 2015, 4 pages.
Office Action for Chinese Patent Application No. 201080045277.6, dated Sep. 26, 2013, 5 pages (No Translation).
Notification of Reason for Refusal for Japanese Patent Application No. 2012-520769, dated Mar. 5, 2014, 10 pages.
Notice of Reasons for Rejection for Japanese Patent Application No. 2015-037591, dated Dec. 11, 2015, 17 pages.
Decision of Rejection for Japanese Patent Application No. 2015-037591, dated Aug. 23, 2016, 13 pages.
Final Rejection for Japanese Patent Application No. 2012-520821, dated Feb. 9, 2015, 4 pages.
Notification of Reason for Refusal for Japanese Patent Application No. 2012-533215, dated Sep. 26, 2013, 5 pages.
Notification of Reason for Refusal for Japanese Patent Application No. 2012-533215, dated Jun. 27, 2014, 12 pages.
Decision of Refusal for Korean Patent Application No. 10-2012-7003687, dated Dec. 26, 2014, 5 pages.
First Office Action for Korean Patent Application No. 10-2015-7007662, dated May 12, 2015, 8 pages.
Reasons for Decision of Rejection for Korean Divisional Patent Application No. 10-2015-7007662, dated Dec. 24, 2015, 5 pages.
Reasons for Decision of Rejection for Korean Divisional Patent Application No. 10-2015-7007662, dated Apr. 28, 2016, 5 pages.
Office Action for Korean Patent Application No. 10-2012-7011568, dated Oct. 21, 2013, 8 pages.
International Search Report and Written Opinion for PCT/US2010/042079, dated Mar. 23, 2011, 14 pages.
International Preliminary Report on Patentability for PCT/US2010/042079, dated Jan. 24, 2012, 19 pages.
Examination Report for European Patent Application No. 10740788A, dated May 20, 2015, 4 pages.
International Search Report and Written Opinion for PCT/US2010/050711, dated Jul. 1, 2011, 15 pages.
Written Opinion for PCT/US2010/050711, dated Nov. 18, 2011, 6 pages.
International Preliminary Report on Patentability for PCT/US2010/050711, dated Jan. 27, 2012, 17 pages.
Non-Final Office Action for U.S. Appl. No. 12/484,542, dated Apr. 5, 2012, 6 pages.
Non-Final Office Action for U.S. Appl. No. 12/484,542, dated Nov. 19, 2012, 15 pages.
Notice of Allowance for U.S. Appl. No. 12/484,542, dated Mar. 22, 2013, 8 pages.
Restriction Requirement for U.S. Appl. No. 12/573,982, dated Jun. 6, 2012, 6 pages.
Non-Final Office Action for U.S. Appl. No. 12/573,982, dated Sep. 4, 2012, 13 pages.
Final Office Action for U.S. Appl. No. 12/573,982, dated Mar. 1, 2013, 16 pages.
Advisory Action for U.S. Appl. No. 121573,982, dated May 15, 2013, 3 pages.
Non-Final Office Action for U.S. Appl. No. 12/573,982, dated Jul. 18, 2013, 15 pages.
Final Office Action for U.S. Appl. No. 12/573,982, dated Dec. 5, 2013, 15 pages.
Examiner's Answer for U.S. Appl. No. 12/573,982, dated Aug. 20, 2014, 19 pages.
Non-Final Office Action for U.S. Appl. No. 12/573,982, dated Jan. 9, 2015, 13 pages.
Final Office Action for U.S. Appl. No. 12/573,982, dated Aug. 24, 2015, 11 pages.
Non-Final Office Action for U.S. Appl. No. 12/573,982, dated Dec. 18, 2015, 10 pages.
Non-Final Office Action for U.S. Appl. No. 12/628,594, dated Sep. 24, 2012, 9 pages.
Examiner's Answer for U.S. Appl. No. 12/628,594, dated Oct. 24, 2013, 12 pages.
Decision on Appeal for U.S. Appl. No. 12/628,594, dated Apr. 19, 2016, 6 pages.
Restriction Requirement for U.S. Appl. No. 12/690,373, dated Apr. 18, 2013, 8 pages.
Non-Final Office Action for U.S. Appl. No. 12/690,373, dated Aug. 7, 2013, 11 pages.
Final Office Action for U.S. Appl. No. 12/690,373, dated Jan. 30, 2014, 12 pages.
Non-Final Office Action for U.S. Appl. No. 12/690,373, dated Sep. 12, 2014, 12 pages.
Final Office Action for U.S. Appl. No. 12/690,373, dated Apr. 30, 2015, 11 pages.
Restriction Requirement for U.S. Appl. No. 12/836,688, dated Jul. 31, 2013, 9 pages.
"Related Korean Patent Application No. KR 10-2012-7003687", "Office Action", dated Feb. 27, 2014, Publisher: KIPO, Published in: KR.
Non-Final Office Action for U.S. Appl. No. 12/628,594, dated Oct. 26, 2016, 11 pages.
First Office Action for Korean Patent Application No. 10-2012-7003688, dated Aug. 31, 2016, 12 pages.
Examination Report for European Patent Application No. 10763940.3, dated Oct. 4, 2016, 5 pages.
Final Office Action for U.S. Appl. No. 12/573,982, dated Jan. 12, 2017, 12 pages.
Notice of Allowance and Examiner-Initiated Interview Summary for U.S. Appl. No. 13/032,119, dated Jan. 18, 2017, 18 pages.
Notice of Allowance, Applicant-Initiated Interview Summary, and Notice of Panel Decision from Pre-Appeal Brief Review for U.S. Appl. No. 12/573,982, dated May 31, 2017, 11 pages.
Final Office Action for U.S. Appl. No. 12/628,594, dated Mar. 1, 2013, 9 pages.
Final Office Action for U.S. Appl. No. 12/628,594, dated Apr. 7, 2017, 10 pages.
Final Office Action for U.S. Appl. No. 12/836,688, dated Feb. 25, 2014, 15 pages.
Pretrial Report for Japanese Patent Application No. 2015-037591, dated Jan. 31, 2017, 6 pages.
Advisory Action, Examiner-Initiated Interview Summary, and AFCP 2.0 Decision for U.S. Appl. No. 12/628,594, dated Jun. 23, 2017, 4 pages.
Examination Report for European Patent Application No. 10763940.3, dated May 10, 2017, 4 pages.
Non-Final Office Action for U.S. Appl. No. 12/628,594, dated Sep. 12, 2017, 7 pages.
Notice of Reasons for Rejection for Japanese Patent Application No. 2016-251258, dated Dec. 12, 2017, 15 pages.
Final Office Action for U.S. Appl. No. 12/628,594, dated Mar. 5, 2018, 7 pages.
First Examination Report for Indian Patent Application No. 787/MUMNP/2012, dated Mar. 8, 2018, 6 pages.
Examination Report for European Patent Application No. 10763940.3, dated May 23, 2018, 5 pages.

(56) References Cited

OTHER PUBLICATIONS

Notice of Reasons for Refusal for Japanese Patent Application No. 2016-251258, dated Aug. 21, 2018, 14 pages.
Examination Report for European Patent Application No. 10740788.4, dated Dec. 3, 2018, 5 pages.

* cited by examiner

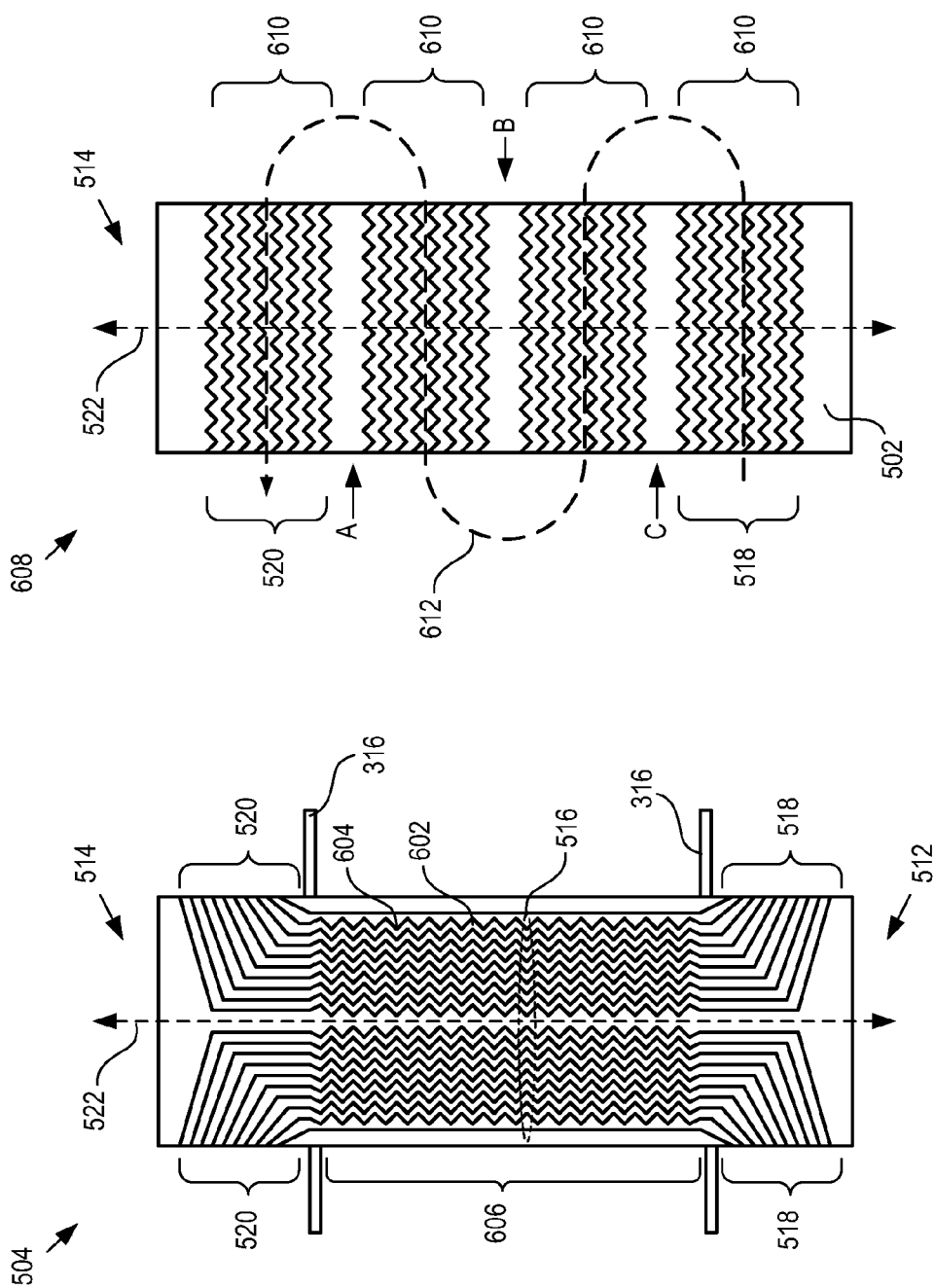

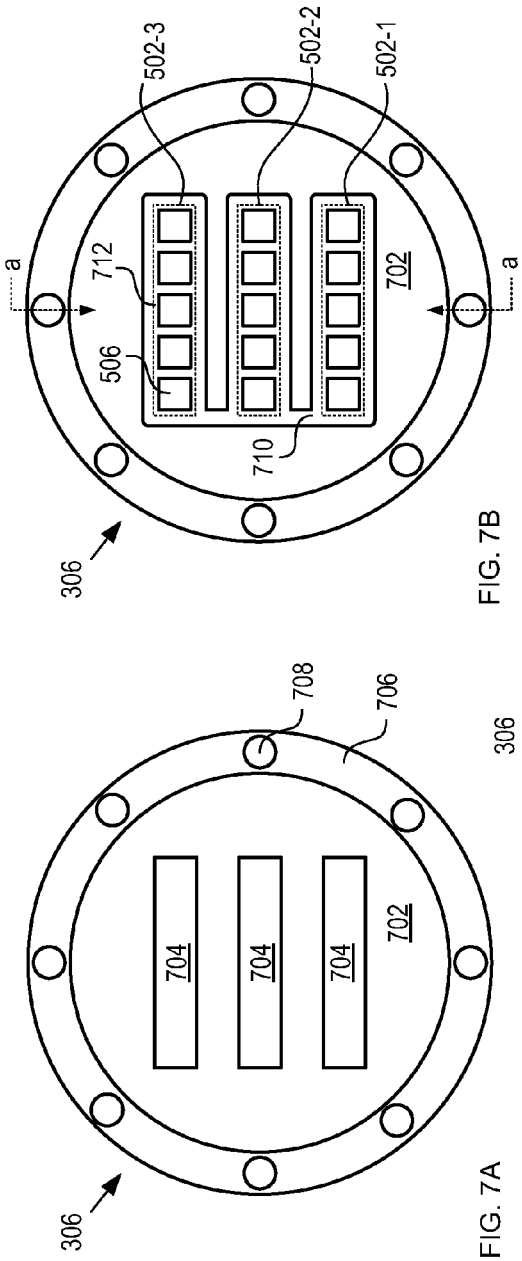
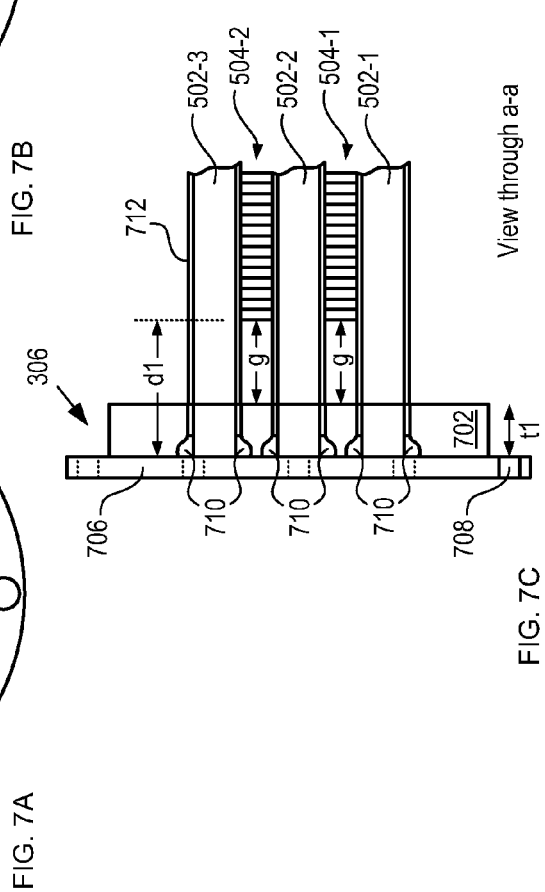

HEAT EXCHANGER AND METHOD FOR MAKING

CROSS REFERENCE TO RELATED APPLICATIONS

This case claims priority of U.S. Provisional Patent Application Ser. No. 61/226,487, which was filed Jul. 17, 2009, and which is incorporated herein by reference.

If there are any contradictions or inconsistencies in language between this application and one or more of the cases that have been incorporated by reference that might affect the interpretation of the claims in this case, the claims in this case should be interpreted to be consistent with the language in this case.

FIELD OF THE INVENTION

The present invention relates to heat exchangers in general, and, more particularly, to heat exchangers for Ocean Thermal Energy Conversion systems.

BACKGROUND OF THE INVENTION

Ocean thermal energy conversion ("OTEC") is a method for generating electricity based on the temperature difference that exists between deep and shallow waters of a large body of water, such as an ocean. An OTEC system utilizes a heat engine (i.e., a thermodynamic device or system that generates electricity based on a temperature differential) that is thermally coupled between relatively warmer shallow and relatively colder deep water.

One heat engine suitable for OTEC is based on the Rankine cycle, which uses a low-pressure turbine. A closed-loop conduit containing a "working fluid" characterized by a low boiling point (e.g., ammonia) is thermally coupled with warm seawater at a first heat exchanger where the working fluid is vaporized. The expanding vapor is forced through the turbine, which drives a turbo-generator. After exiting the turbine, the vaporized working fluid is condensed back into a liquid state at a second heat exchanger where the closed-loop conduit is thermally coupled with cold seawater. The condensed working fluid is then recycled through the system.

OTEC systems have been shown to be technically viable, but the high capital cost of these systems has thwarted commercialization. The heat exchangers are the second largest contributor to OTEC plant capital cost (the largest is the cost of the offshore moored vessel or platform). The optimization of the enormous heat exchangers that are required for an OTEC plant is therefore of great importance and can have a major impact on the economic viability of OTEC technology.

One of the most efficient and cost-effective types of industrial heat exchangers is a plate-fin heat exchanger. Plate-fin heat exchangers can have higher surface area (due to their potential for high fin packing density) as compared to other types of heat exchangers, such as conventional tube and shell, plate-frame, etc. As a result, a plate-fin heat exchanger can have higher heat transfer efficiency, which makes it an attractive candidate for use in applications that require high fluid flow rates but are characterized by low temperature differentials, such as OTEC.

One of the highest efficiency plate-fin heat exchangers is the brazed-aluminum plate-fin heat exchanger, which comprises multiple layers of aluminum fins and plates that are made of materials having good thermal conductivity. The fins and plates are stacked and joined, using brazing, to form alternating passages for conveying fluids. In operation, fluids of different temperatures are passed through the alternating passages and heat energy is transferred between the fluids through the fin and plate materials.

Brazing is a well-known, low-cost process for joining mechanical elements. It is similar to soldering; however, brazing uses brazing-filler material that has a higher melting temperature (typically ≥450° C.) than traditional solder (~250-300° C.). In many applications, brazing is preferred over soldering because brazing fillers have higher structural strength. In fact, brazed connections are often nearly as strong as the parts they connect, even at elevated temperatures.

In addition, complete assemblies comprising many brazed joints can be brazed at one time by arranging the assemblies, with brazing-filler material in place at each desired brazed joint. The entire arrangement is then heated at the same time, which induces the brazing-filler material to melt and fuse to its adjacent elements. As a result, the use of brazing offers significant cost advantages over many other joining technologies, such as fusion welding, etc.

Unfortunately, brazed joints are highly susceptible to galvanic-corrosion when exposed to a highly electrically conductive medium, such as seawater, geothermal fluid, mineral water, polluted water, and salt spray. The typical brazing process utilizes a filler aluminum alloy that has a lower melting temperature than the parent (base) metal being joined. Thus, the filler metal has different chemical composition and electric potential than the parent metal. The dissimilar metals, therefore, create a galvanic cell at the joint. Galvanic action at the joint induces metal migration (i.e., corrosion). In the presence of a conductive medium (e.g., seawater), the galvanic action at the joint is enhanced, which accelerates degradation of the joint. Furthermore, brazed joints that have failed because of galvanic-corrosion-related degradation usually cannot be reliably or cost-effectively refurbished.

SUMMARY OF THE INVENTION

The present invention provides a plate-fin heat exchanger without some of the costs and disadvantages of the prior art. Embodiments of the present invention are particularly well-suited for use in OTEC systems; however, embodiments in accordance with the present invention are also suited for use in other heat exchanger applications, such as nuclear reactors, chemical plants, and the like.

The illustrative embodiment of the present invention comprises a heat exchanger core that includes a plurality of plates, each having a plurality of flow channels for conveying seawater through the heat exchanger. The plates are interposed by layers of fins that collectively form flow channels for conveying working fluid through the heat exchanger.

Like the prior-art, the fins are joined to the plates using a brazing process. In contrast to the prior-art, the present invention provides seals that fluidically isolate the brazed joints from the seawater. These seals are formed at each end of the core by joining the plates and a face sheet, disposed at that end, with a galvanic-corrosion-resistant joint. Because the brazed regions are not exposed to seawater, corrosion of the brazed joints is mitigated.

In some embodiments, the galvanic-corrosion-resistant joints are friction-stir welded, with the plates and the face sheets consisting of the same material. Therefore, the galvanic-corrosion-resistance of the joints is enhanced since they do not include dissimilar metals.

In some embodiments, at each end of the core, each plate of the core is individually joined to a face sheet to collectively define a seal. In some of these embodiments, the plates extend beyond the layers of fins at the face sheet such that face sheet and each of the layers of fins are separated by a gap sufficient to inhibit the trapping of fluids between them. In such embodiments, therefore, crevice corrosion is mitigated.

In some embodiments, bars that are partially clad with brazing-filler material are interposed between the plates and arranged so that the clad portions are located toward the interior of the core. A bar is located at each end of the core. The bars and plates are first joined by brazing the clad portion of each bar to each of its adjacent plates. After brazing, the unclad portions of the bars are friction-stir welded to the plates. As a result, the entire outer surface of the core is brazed-joint-free. At each end of the core, the plates and bars collectively define an end face that is brazed-joint free. Each end face of the core is then friction-stir welded to a face sheet to define a seal.

In some embodiments, a heat exchanger comprises a plurality of cores, each having a first end and second end. Each of the first ends is joined to a first face sheet and each of the second ends is joined to a second face sheet. As a result, the present invention enables large capacity heat exchangers.

An embodiment of the present invention comprises a heat exchanger comprising: a first core, wherein the first core comprises a first layer comprising a first channel for conveying a first fluid, and a second layer comprising a plurality of fins that define a first plurality of flow channels, wherein the second layer is brazed to the first layer; a first plate disposed at a first end of the core, wherein the first plate and the first end of the first core are joined via a first joint that is a galvanic-corrosion-resistant joint; and a second plate disposed at a second end of the first core, wherein the second plate and the second end of the first core are joined via a second joint that is a galvanic-corrosion-resistant joint.

BRIEF DESCRIPTION OF THE DRAWINGS

FIG. 6A depicts a top view of layer 504 in accordance with the illustrative embodiment of the present invention.

FIG. 6B depicts a top view of a heat exchanger core in accordance with a first alternative embodiment of the present invention.

FIG. 7A depicts a schematic drawing of a face sheet in accordance with the illustrative embodiment of the present invention.

FIG. 7B depicts a schematic drawing of face sheet 306 after it is joined with core 302.

FIG. 7C depicts a schematic drawing of a cross-sectional view, through line a-a of FIG. 7B, of face sheet 306 after it is joined with core 302.

DETAILED DESCRIPTION

Figure 1:
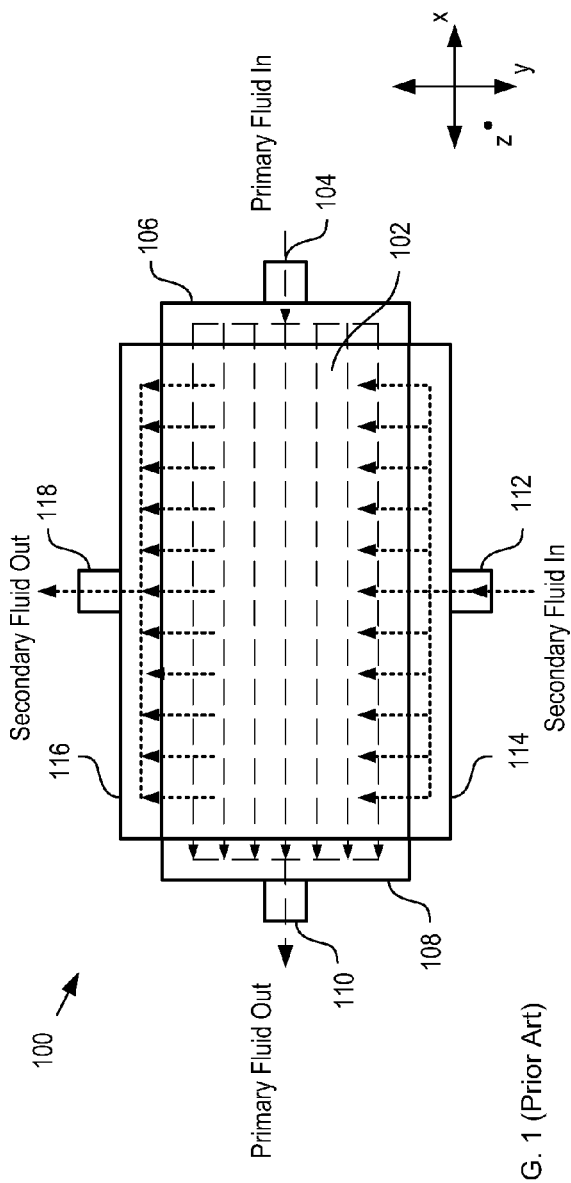
FIG. 1 depicts a schematic diagram of plate-fin heat exchanger in accordance with the prior art.

FIG. 1 depicts a schematic diagram of plate-fin heat exchanger in accordance with the prior art. Heat exchanger 100 comprises core 102, primary fluid inlet 104, manifolds 106, 108, 114, and 116, primary fluid outlet 110, secondary fluid inlet 112, and secondary fluid outlet 118.

In operation, heat exchanger 100 receives primary fluid at primary fluid inlet 104, which is fluidically coupled with manifold 106. Manifold 106 distributes the primary fluid to a plurality of flow channels, aligned with the x-direction, which are defined in core 102. After passing through core 102, the primary fluid is collected at manifold 108 and provided to primary fluid outlet 110.

In similar fashion, heat exchanger 100 receives secondary fluid at secondary fluid inlet 112, which is fluidically coupled with manifold 112. Manifold 112 distributes the secondary fluid to a plurality of flow channels, aligned with the y-direction, which are defined in core 102. After passing though core 102, the secondary fluid is collected at manifold 116 and provided to secondary fluid outlet 118.

Figure 2:
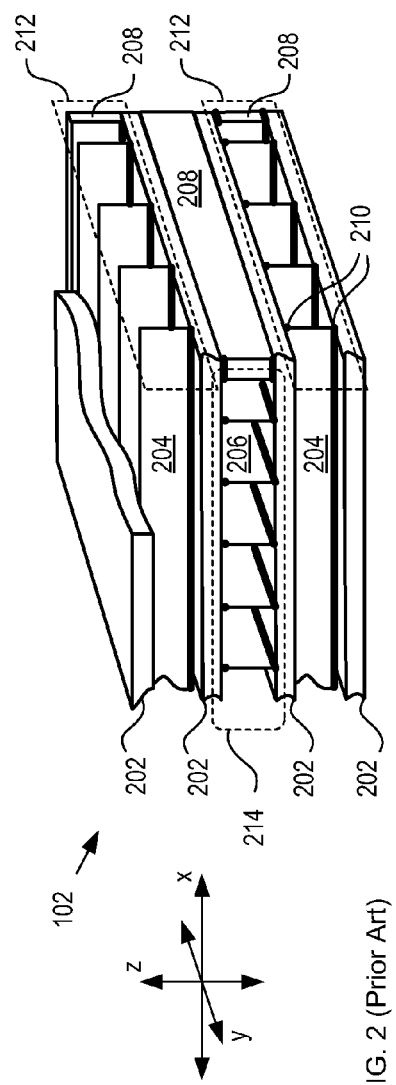
FIG. 2 depicts a portion of a heat exchanger core in accordance with the prior art.

FIG. 2 depicts a portion of a heat exchanger core in accordance with the prior art. Core 102 comprises parting sheets 202, fins 204, and spacer bars 208.

Parting sheets 202 are thin layers of thermally conductive material to which fins 204 and 206 are joined. Fins 204 and 206 are joined to parting sheets 202 via brazing joints 210. Many materials have been considered for use in parting sheets 202 and fins 204 and 206 including titanium, copper-nickel alloys, and aluminum. For OTEC applications, however, aluminum (or some of its alloys) is typically used for these elements because it is lightweight and also offers good compatibility with ammonia and seawater (the most commonly used primary and secondary fluids) at low cost.

Fins 204 define flow channels 212, which convey primary fluid through core 102. Fins 206 define flow channels 214, which convey secondary fluid through core 102. Fins 204 are oriented along the x-direction and fins 206 are oriented along the y-direction. Heat exchanger 100, therefore, operates as a cross-flow heat exchanger.

Spacer bars 208 are also brazed to parting sheets 202. Spacer bars 208 define the extent of channels 212 and 214 and also determine the dimension of the channels along the z-direction.

As the primary and secondary fluids pass through core 102, heat is exchanged between the fluids through the materials of parting sheets 202 and fins 204 and 206.

Although brazed aluminum-fin plate-fin heat exchangers, such as heat exchanger 100, offer superior heat transfer efficiency and low-cost fabrication, brazed joints 210 limit their applicability for OTEC applications. As discussed above, the brazing-filler material used to form a brazed joint must have a lower melting point than the material to be joined. In order to attain this lower melting point, the composition of the brazing-filler material is different than that of the materials being joined. As a result, brazed joints necessarily include dissimilar metals that are prone to galvanic-corrosion—particularly in the presence of an electrically conductive medium, such as seawater. As a result, such heat exchangers, to date, have not commonly been used in OTEC systems.

The present invention provides a means of mitigating or overcoming the enhanced galvanic-corrosion associated with brazed joints, while simultaneously exploiting the brazing process to form a low-cost heat exchanger core. Like the prior art, the present invention relies on brazing to join fins and plates to form a heat exchanger core. In contrast to the prior art, however, the present invention employs friction-stir welding to join face sheets to the ends of the heat exchanger core and thereby create seals that fluidically isolate the brazed joints from exposure to seawater.

Figure 3:
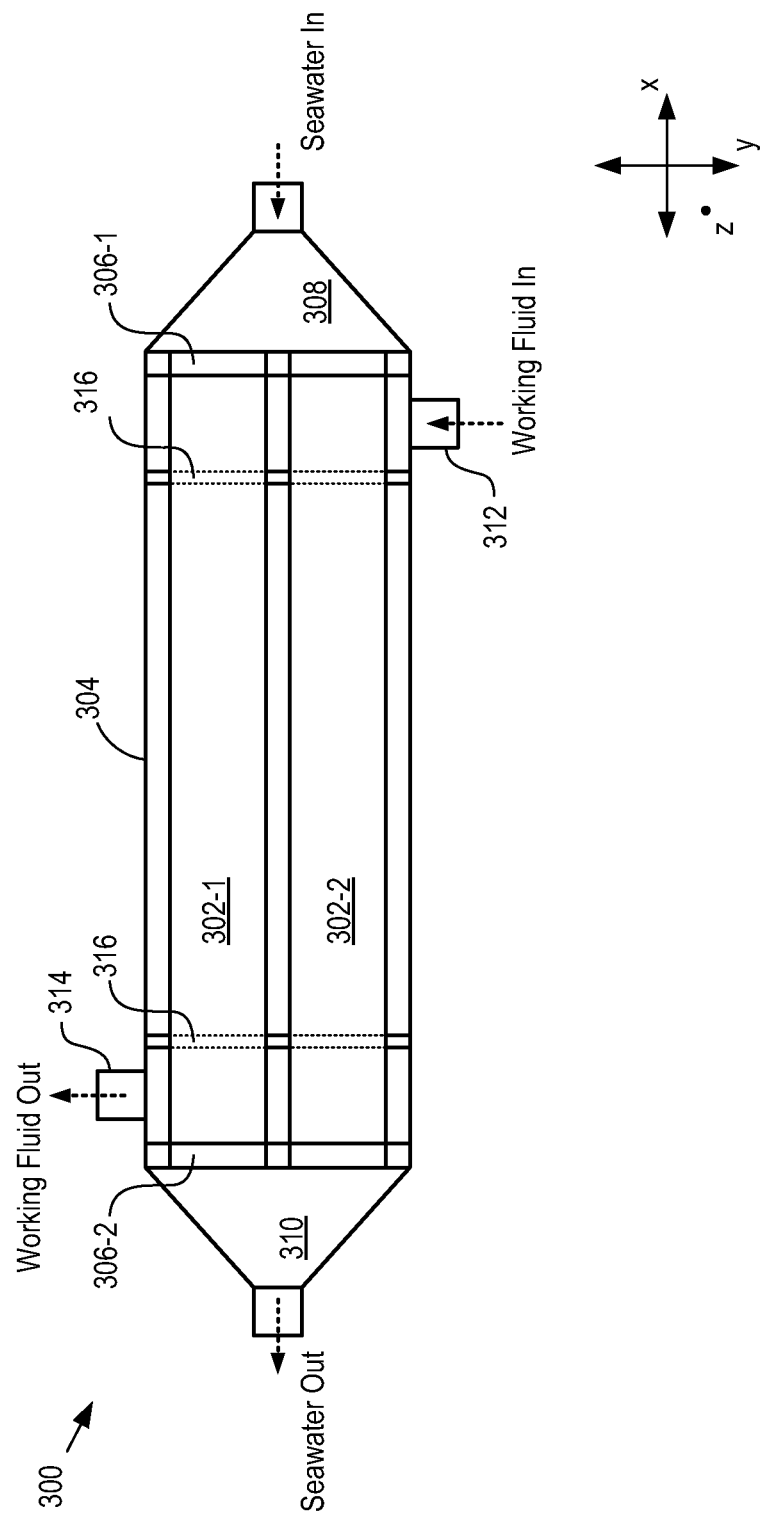
FIG. 3 depicts a heat exchanger in accordance with an illustrative embodiment of the present invention.

FIG. 3 depicts a heat exchanger in accordance with an illustrative embodiment of the present invention. Heat exchanger 300 comprises heat exchanger cores 302-1 and 302-2, shell 304, face sheets 306-1 and 306-2, seawater inlet port 308, seawater outlet port 310, working fluid inlet 312, working fluid outlet 314, and baffles 316.

Figure 4:
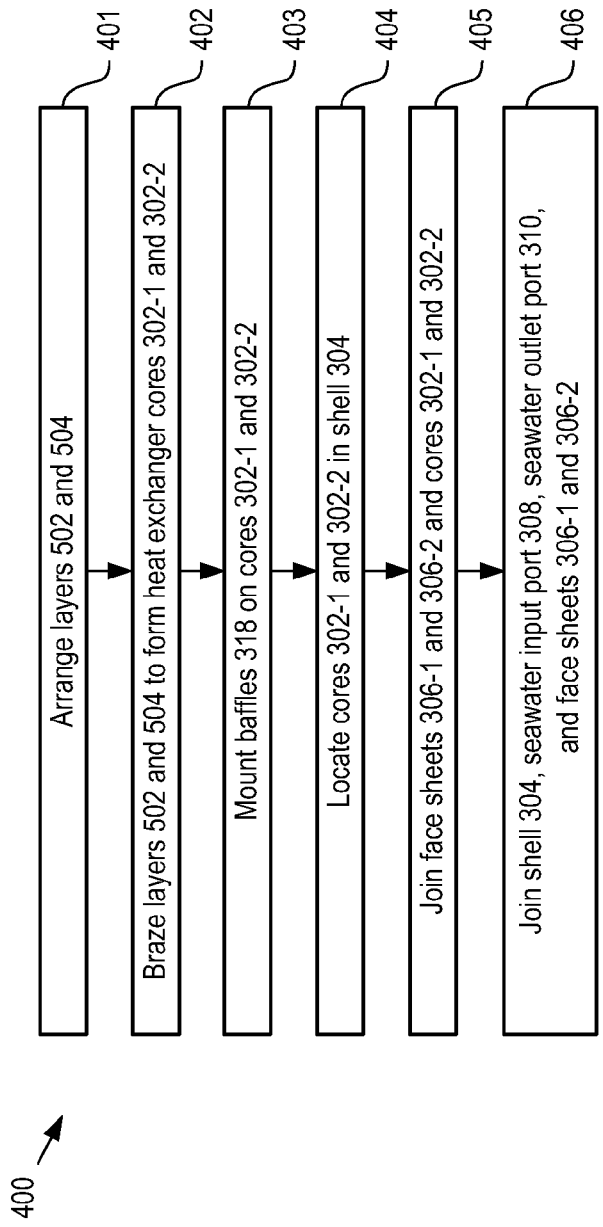
FIG. 4 depicts operations of a method suitable for fabrication of a heat exchanger in accordance with the illustrative embodiment of the present invention.

FIG. 4 depicts operations of a method suitable for fabrication of a heat exchanger in accordance with the illustrative embodiment of the present invention. Method 400 begins with operation 401, wherein cores 302-1 and 302-2 are arranged to form heat exchanger core 302. Method 400 is described with continuing reference to FIG. 3 and reference to FIGS. 5-9.

Figure 5:
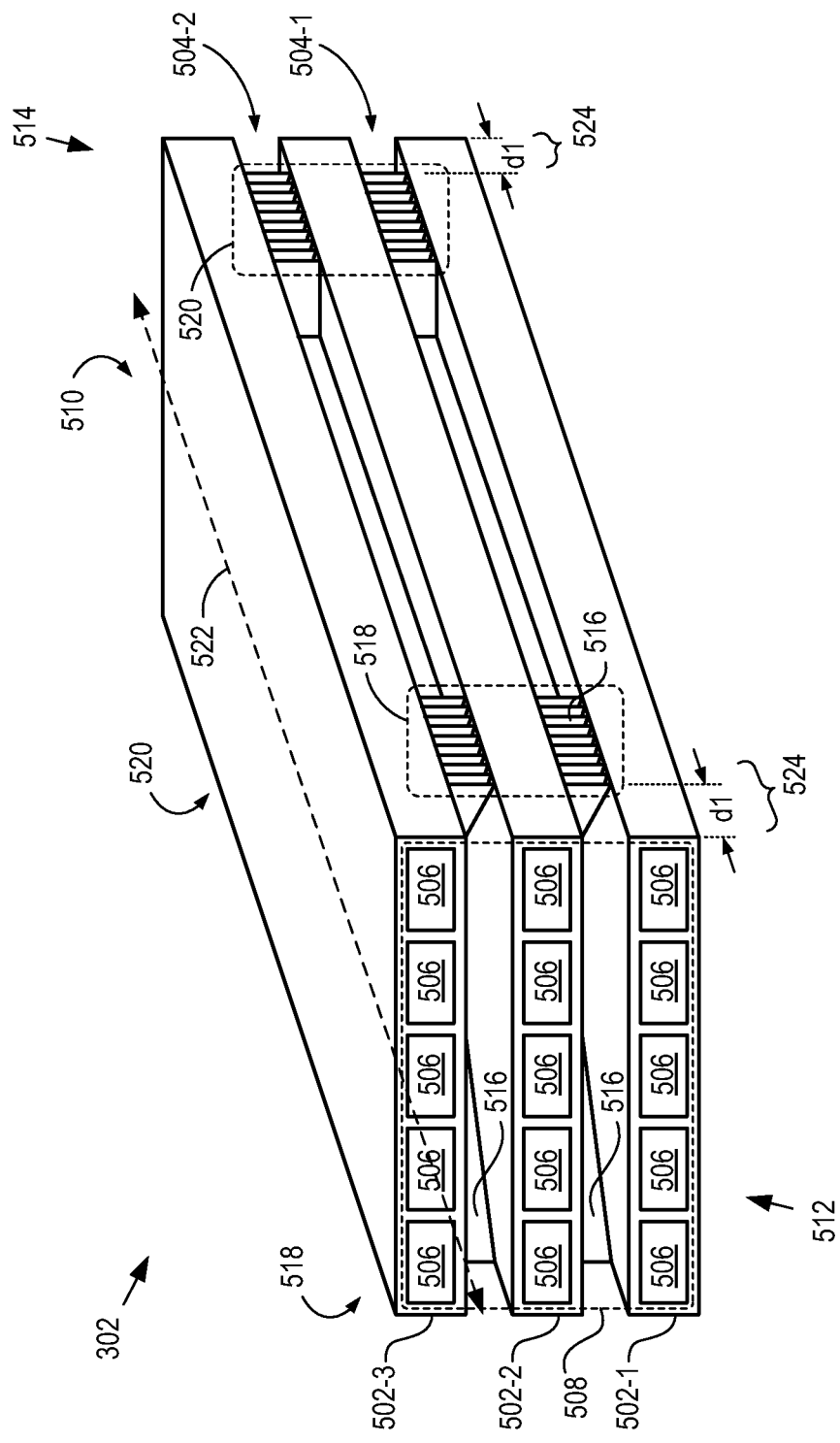
FIG. 5 depicts a schematic diagram of perspective view of a heat exchanger core in accordance with the illustrative embodiment of the present invention.

FIG. 5 depicts a schematic diagram of perspective view of a heat exchanger core in accordance with the illustrative embodiment of the present invention. Heat exchanger core 302 comprises layers 502-1 through 502-3 (referred to collectively as layers 502) and layers 504-1 through 504-2 (referred to collectively as layers 504). Heat exchanger core 302 is representative of each of heat exchanger cores 302-1 and 302-2.

Layers 502 and 504 are stacked in an alternating arrangement wherein each adjacent pair of layers 502 is interposed by a layer 504. For example, layers 502-1 and 502-2 are interposed by layer 504-1.

Each of cores 302-1 and 302-2 (referred to collectively as cores 302) is a heat exchanger core suitable for transferring heat between seawater and a working fluid, such as ammonia. Cores 302-1 and 302-2 are substantially identical cores 302. In some embodiments, cores 302-1 and 302-2 have different design features.

Each of layers 502 is an extruded aluminum alloy plate that comprises a plurality of flow passages 506 for conveying seawater through each of layers 502. Each of layers 502 further comprises a layer of brazing-filler material disposed on its top and bottom surfaces (not shown in FIG. 5). Preferably, layers 502 comprise the same material as face sheets 306 to mitigate galvanic-corrosion in heat exchanger 300. Passages 506 collectively define seawater inlet 508 at first end 512 of core 302 and seawater outlet 510 at second end 514 of core 302. It should be noted that layers 502 are depicted as having five flow channels 508 for exemplary purposes only. One skilled in the art will recognize, after reading this specification, that one or more layers 502 can comprise any practical number of flow channels, including a single flow channel.

Each of layers 504 is an arrangement of fins 516 that collectively define a plurality of flow channels for conveying working fluid through core 302.

FIG. 6A depicts a top view of layer 504 in accordance with the illustrative embodiment of the present invention. Layer 504 comprises fins 516, which are corrugated aluminum fins. Fins 516 collectively define a plurality of flow channels 602. Corrugations 604 facilitate heat transfer in the heat exchanger by inducing turbulence in the flow of working fluid as it passes through flow channels 604. In addition, corrugations 604 augment the mechanical strength of core 302.

In flow section 606, fins 516 are arranged such that they are substantially parallel with one another and define a substantially straight path that is parallel to axis 522. As a result, layers 502 and 504 are arranged in a substantially parallel flow arrangement, wherein the seawater and working fluid flow in the same direction along a direction aligned with axis 522. In some embodiments, the seawater and working fluid flow in opposite directions along a direction that is aligned with axis 522. In some embodiments, fins 516 are substantially orthogonal to flow channels 506 and core 302 is arranged in a cross-flow arrangement. In some embodiments, fins 516 are not corrugated.

Near first end 512, fins 516 collectively define a pair of working fluid entrances 518. Near second end 514, fins 516 collectively define a pair of working fluid exits 520. Fins 516, working fluid entrances 518, and working fluid exits 520 are distributed symmetrically about axis 522 to mitigate pressure drops associated the distribution of working fluid to each of the flow channels. In some embodiments, all of the flow channels defined by fins 516 are fed from a single working fluid entrance 518 and are terminated at a single working fluid exit 520. In some embodiments, fins 516 comprise a material other than aluminum. Preferably, fins 516 comprise a material that has high thermal conductivity and good resistance to the working fluid conveyed by heat exchanger 300.

At each of first end 512 and second end 514, layers 502 comprise projections 524 that project beyond layers 504 along the direction of axis 522 by distance, d1. Projections 524 facilitate the joining of layers 502 to each of face sheets 306-1 and 506-2 via a galvanic-corrosion-resistant joint, such as a friction-stir weld. In some embodiments, the value of d1 is selected to ensure that layers 504 and face sheets 306-1 and 506-2 are separated by a gap that mitigates contamination trapping between fins 516 and the face sheets.

FIG. 6B depicts a top view of a heat exchanger core in accordance with a first alternative embodiment of the present invention. Heat exchanger core 608 represents an example of one of many alternative arrangements for a layer of fins 516 that are in accordance with the present invention. One skilled in the art will recognize, after reading this invention, that fins 516 can be arranged in any of several different ways to achieve acceptable heat transfer between the seawater and working fluid that flows through core 302. For example, fins 516 can be arranged, with respect to flow channels 506, in a parallel-flow arrangement, counter-flow arrangement, cross-flow arrangements, and the like, without departing from the principles of the present invention. For example, heat exchanger 608 represents a cross-flow arrangement. Fins 516 are arranged in four flow regions 610, wherein the fins define flow channels 604. Fins 516 are arranged such that flow channels 604 are substantially orthogonal to flow channels 506. In addition, each flow region 610 comprises a working fluid entrance 518 and a working fluid exit 520.

Heat exchanger core 608 enables the working fluid to enter and exit layers 608 at several points. In operation, baffles would typically be included at points A, B, and C to block the flow of the working fluid along the outer surface of core 608. The baffles ensure that the working fluid follows flow path 612 as it transits core 608. In other words, the baffles direct the working fluid such that it "weaves" in and out of core 608 along flow path 612.

Returning now to the illustrative embodiment of the present invention, at operation 402, stacked layers 502 and 504 are heated in a brazing oven to melt the brazing-filler material disposed on the top and bottom surfaces of layers 502. The brazing-filler material joins the fins 516 of each layer 504 to each of its corresponding adjacent layers 502 in conventional fashion. The joined structure is then cooled such that layers 502 and 504 form a substantially rigid structure. In some embodiments, fusion welding is used to join layers 502 and 504.

Although the illustrative embodiment comprises three layers 502 interposed by two layers 504, it will be clear to one skilled in the art, after reading this specification, how to specify, make, and use alternative embodiments of the present invention wherein a heat exchanger core comprises any number of layers 502 and any number of layers 504. Further, it will be clear, after reading this specification, that one or both of the outer layers of a heat exchanger core can be either of layers 502 and 504.

At operation 403, baffles 316 are mounted to cores 302-1 and 302-2. A first baffle 316 is located such that working fluid entrances 518 interpose the first baffle and first end 512. A second baffle 316 is located such that working fluid exits 520 interpose the second baffle and second end 514. Baffles 316 are conventional baffles that force the working fluid into and through cores 302 during its transit through shell 304. In other words, baffles 316 block the flow of working fluid along the outside of cores 302. As a result, baffle 316, shell 304, and working fluid inlet 312 collectively define a manifold for providing working fluid to each of cores 302. In similar fashion, baffle 316, shell 304, and working fluid outlet 314 collectively define a manifold for receiving working fluid from each of cores 302.

At operation 404, shell 304 is located around cores 302-1 and 302-2.

Shell 304 is a cylindrical enclosure for containing cores 302-1 and 302-2. Shell 304 comprises working fluid inlet 312, working fluid outlet 314, which enable the flow of working fluid into and out of the interior of shell 304 and cores 302-1 and 302-2. Shell 304 is made of a material suitable for withstanding the pressures exerted on heat exchanger 300 while operating at its deployment location. Although the illustrative embodiment heat exchanger 300 comprises a shell that has a circular cross-section, it will be clear to one skilled in the art, after reading this specification, how to specify, make, and use alternative embodiments of the present invention comprising a shell that has a cross-sectional shape that is other than circular, such as a square, rectangle, elliptical, or irregular shape. It will be clear to one skilled in the art, after reading this specification, how to specify, make, and use shell 304.

At operation 405, face sheets 306-1 and 306-2 are joined with cores 302-1 and 302-2 via galvanic-corrosion-resistant joints.

FIG. 7A depicts a schematic drawing of a face sheet in accordance with the illustrative embodiment of the present invention. Face sheet 306 is representative of each of face sheets 306-1 and 306-2.

Face sheet 306 is a substantially rigid plate of aluminum alloy that is suitable for exposure to each of the seawater and working fluid conveyed through heat exchanger 300. Face sheet 306 comprises plate 702 and flange 706, which is rigidly connected to plate 702. Plate 702 comprises openings 704, which are sized to snugly receive projections 524 of layers 502.

Figure 8:
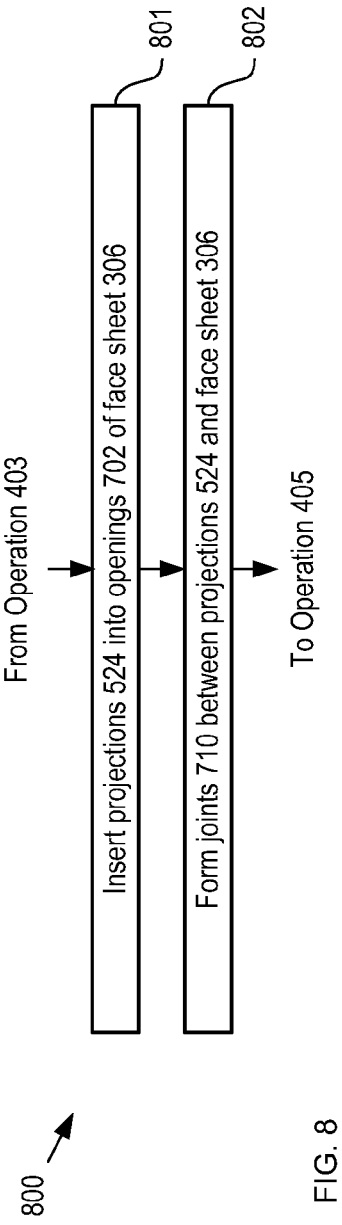
FIG. 8 depicts operations of a sub-method suitable for joining a face sheet and a heat exchanger core in accordance with the illustrative embodiment of the present invention.

FIG. 8 depicts operations of a sub-method suitable for joining a face sheet and a heat exchanger core in accordance with the illustrative embodiment of the present invention. Operation 403 begins with sub-operation 801, wherein projections 524 are inserted into openings 702 of face sheet 306.

At sub-operation 802, each of projections 524 is joined with face sheet 306 to form galvanic-corrosion-resistant joints 710. FIG. 7B depicts a schematic drawing of face sheet 306 after it is joined with core 302.

Joints 710 are friction-stir welds, wherein the material of walls 712 of each of layers 502 and the material of plate 702 that surrounds these walls are intermingled to form a substantially leak-proof seal around each of projections 524.

Friction-stir welding is a well-known method for joining two elements of the same material. Conventional friction-stir welding employs a rotating probe that is forced into the interface between the two elements. The immense friction between the probe and materials causes material in the immediate vicinity of the probe to heat up to temperatures below its melting point. This softens the adjoining sections, but because the material remains in a solid state, its original material properties are retained. Movement of the probe along the weld line forces the softened material from the two pieces towards the trailing edge causing the adjacent regions to fuse, thereby forming a weld.

As opposed to other common joining techniques, such as fusion welding, brazing, etc., friction-stir welding has several performance advantages. In particular, the resultant weld is comprised of the same material as the joined sections. As a result, galvanic corrosion due to contact between dissimilar metals at the joint is reduced or eliminated. Furthermore, the resultant weld retains the material properties of the material of the joined sections. Friction-stir welding is described in detail in U.S. patent application Ser. No. 12/484,542, filed Jun. 15, 2009, which is incorporated herein by reference. In some embodiments, a joining technique other than friction-stir welding is used to join components together with a galvanic-corrosion-resistant joint. In some embodiments, suitable joining techniques include, without limitation, some types of fusion welding, the use of elastomeric, thermoplastic, thermoset or epoxy-based joint compounds, and the like.

Typically, during sub-operation 802, the weld-tool scribes a continuous line to form all of the welds between layers 502 and plate 702 in one step, thereby leaving a continuous joint 710 as depicted in FIG. 7B. In some embodiments, however, the weld-tool is removed from plate 702 after joining each of layers 502 to the plate. This is normally less desirable, however, since forming separate friction-stir welds takes longer, is more expensive, and leaves multiple exit holes (one for each retraction of the weld-tool from plate 702) that can trap particulate, induce bio-fouling, and facilitate crevice-corrosion.

FIG. 7C depicts a schematic drawing of a cross-sectional view, through line a-a of FIG. 7B, of face sheet 306 after it is joined with core 302.

Length, d1, of projections 524 is larger than the thickness, t1, of face sheet 306, gap, g, is formed. Gap, g, is large enough to inhibit the formation of stagnant regions of working fluid that typically arise in crevices found in conventional heat exchangers. As a result, crevice corrosion is mitigated in embodiments of the present invention and the operational lifetime of heat exchangers in accordance with the present invention can be significantly longer.

In some embodiments, heat exchanger 300 transfers heat between a primary fluid other than working fluid and/or a secondary fluid other than seawater (e.g., geothermal fluids, etc.). In some embodiments, face sheets 306 are made of a material other than aluminum alloy, such as aluminum, titanium, graphite composite, copper-nickel alloy, and the like. Each of face sheets 306 comprises holes for receiving cores 302 in a manner to facilitate joining each face sheet and each core with a galvanic-corrosion-resistant joint.

At operation 406, shell 304, seawater input port 308, seawater output port 310, and face sheets 306-1 and 306-2 are joined.

Figure 9A:
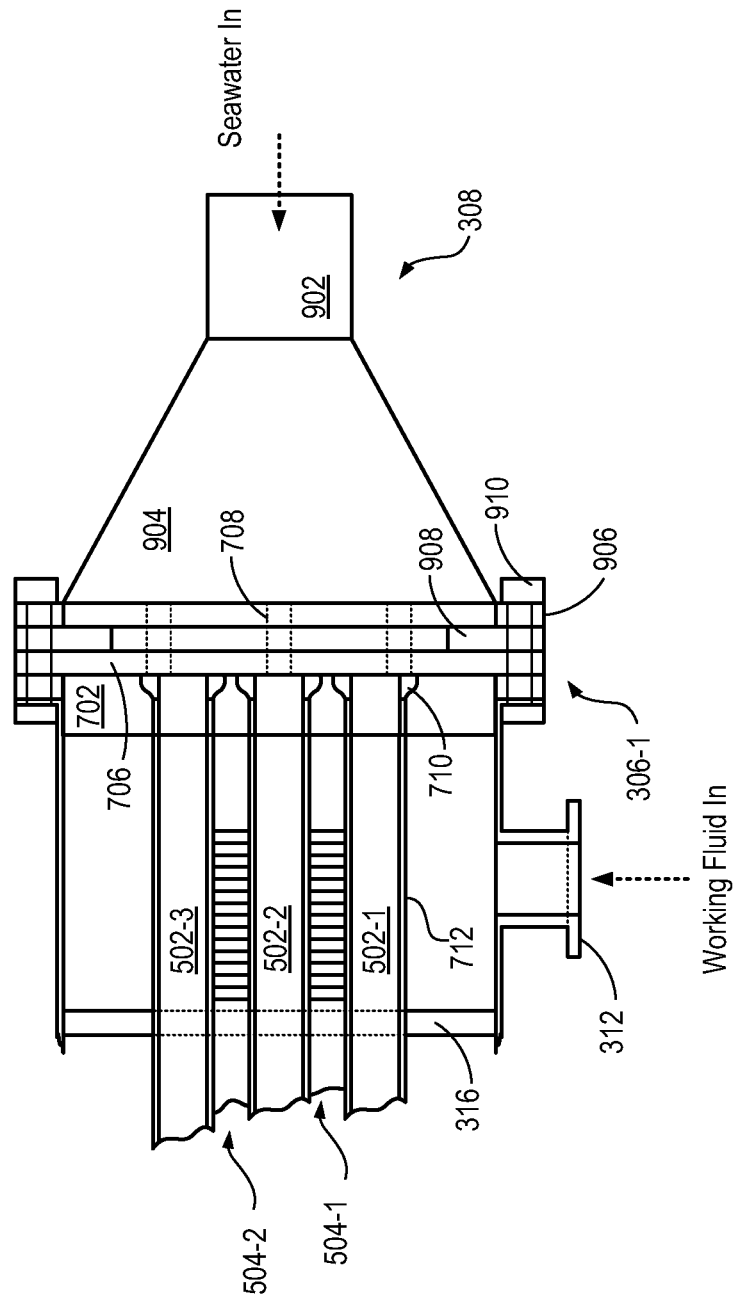
FIGS. 9A and 9B depict schematic drawings of cross-sectional views of the seawater inlet and outlet ends, respectfully, of a fully assembled heat exchanger in accordance with the illustrative embodiment of the present invention.
Figure 9B:
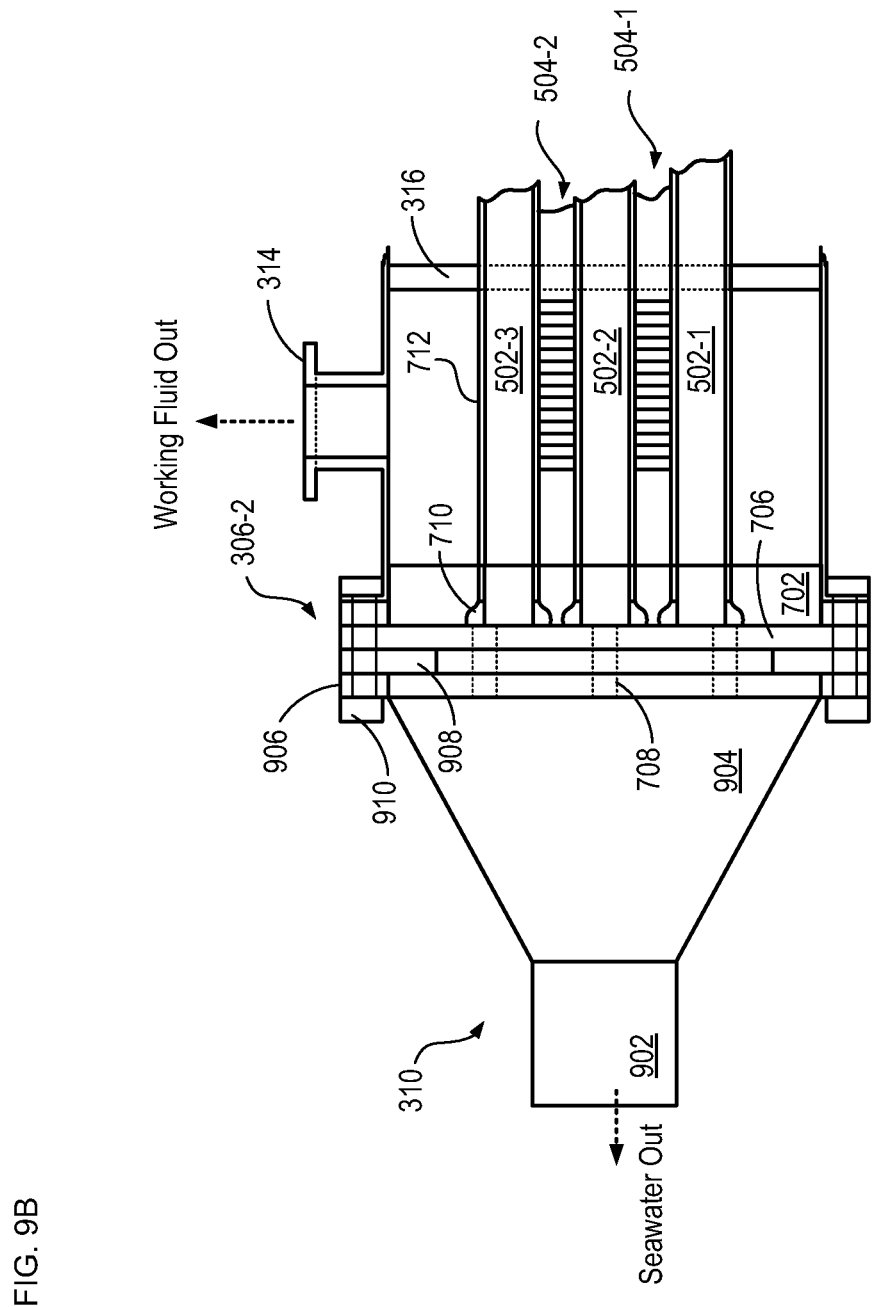

FIGS. 9A and 9B depict schematic drawings of cross-sectional views of the seawater inlet and outlet ends, respectfully, of a fully assembled heat exchanger in accordance with the illustrative embodiment of the present invention.

FIG. 9A depicts seawater inlet end of heat exchanger 300. Seawater inlet port 308 is attached to heat exchanger 300 at the seawater inlet end and comprises conduit 902, diffuser 904, and flange 906. Seawater inlet 308 is fluidically coupled to layers 502 of each of cores 302 via diffuser 904.

Seawater inlet port 308 is mechanically coupled with face sheet 306-1 via flanges 706 and 906. Flanges 706 and 906 are interposed by gasket 908, which facilitates formation of a tight fluidic seal between the flanges. Flanges 706 and 906 are held together by fasteners 910.

By virtue of the fact that joints 710 are substantially leak-proof seals, face sheet 306-1 and layers 502 collectively define a barrier that fluidically isolates seawater inlet port 308 from layers 504.

FIG. 9B depicts seawater outlet end of heat exchanger 300. Seawater outlet port 310 is attached to heat exchanger 300 at the seawater outlet end and comprises conduit 902, diffuser 904, and flange 906. Seawater outlet port 310 is fluidically coupled to layers 502 of each of cores 302 via diffuser 904.

Seawater outlet port 310 is mechanically coupled with face sheet 306-2 via flanges 706 and 906. Flanges 706 and 906 are interposed by gasket 908, which facilitates formation of a tight fluidic seal between the flanges.

By virtue of the fact that joints 710 are substantially leak-proof seals, face sheet 306-2 and layers 502 collectively define a barrier that fluidically isolates seawater outlet port 310 from layers 504.

In some embodiments, diffusers 904 are designed to substantially equalize the pressure and flow rate of the seawater at each seawater flow channel 506 in cores 302.

Figure 10:
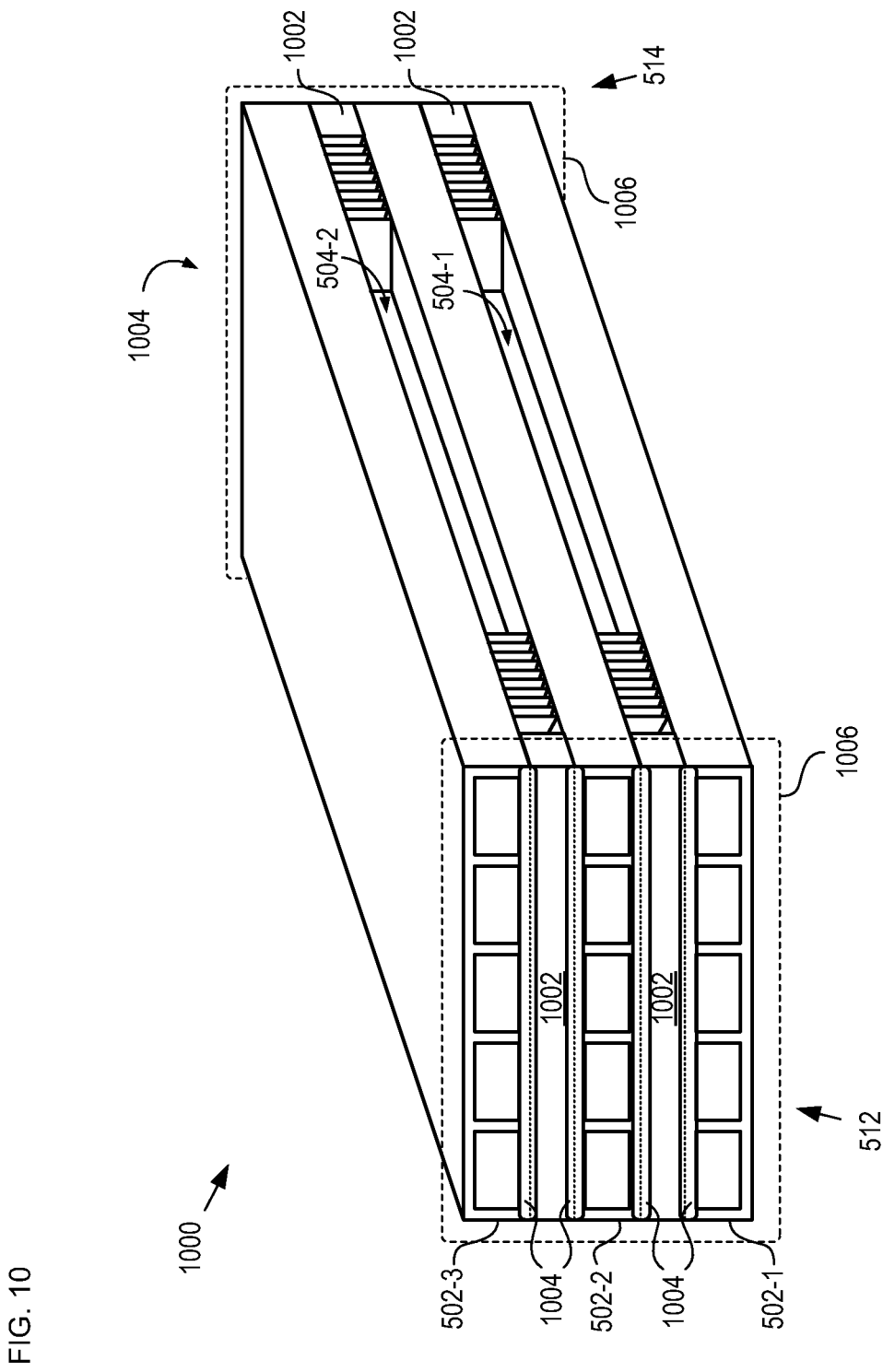
FIG. 10 depicts a schematic diagram of a perspective view of a heat exchanger core in accordance with a second alternative embodiment of the present invention.

FIG. 10 depicts a schematic diagram of a perspective view of a heat exchanger core in accordance with a second alternative embodiment of the present invention. Heat exchanger core 1000 comprises layers 502-1 through 502-3, layers 504-1 through 504-2, and bars 1002.

Figure 11:
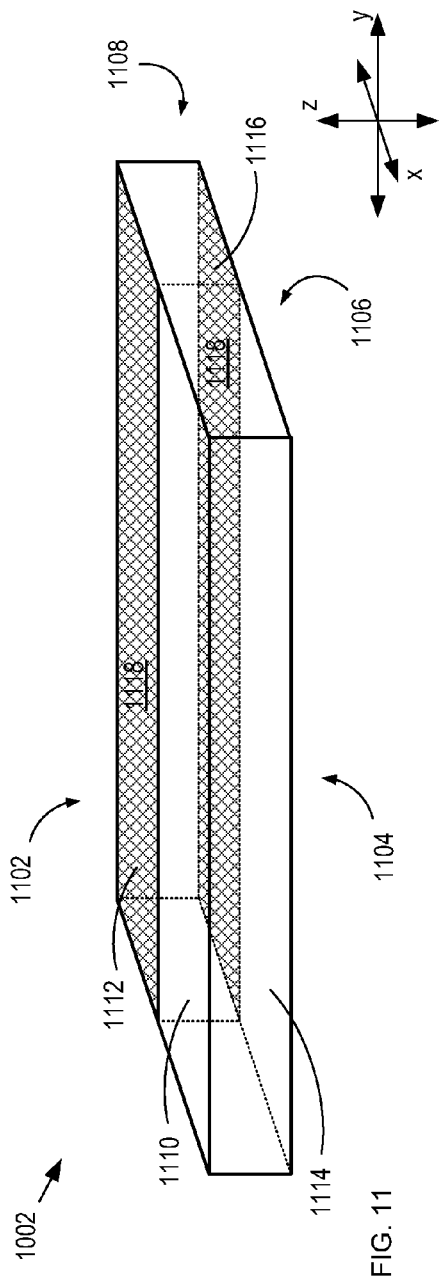
FIG. 11 depicts a schematic drawing of a perspective view of bar 1002.

FIG. 11 depicts a schematic drawing of a perspective view of bar 1002. Bar 1002 is a rectangular bar comprising the same aluminum alloy as face layers 502 and face sheets 306. Bar 1002 comprises top surface 1102 and bottom surface 1104. Bar 1002 includes bar portion 1106 and bar portion 1108. Bar portion 1106 is a portion of bar 1002 that is suitable being joined with adjacent layers 502 via friction-stir welding. Bar portion 1108 is a portion of bar 1002 that is suitable for being joined with adjacent layers 502 via brazing.

Top surface 1102 includes top surface portions 1110 and 1112, which are the top surfaces of bar portions 1106 and 1108, respectively. Bottom surface includes bottom surface portions 1114 and 1116, which are the bottom surfaces of bar portions 1106 and 1108, respectively.

Each of top surface 1112 and bottom surface 1116 of bar portion 1108 comprise cladding 1118. Top surface 1110 and bottom surface 1114 of bar portion 1106 are not clad with brazing-filler material.

Cladding 1118 comprises a conventional brazing-filler material, which is disposed on the surfaces in a conventional manner. In some embodiments, the top and bottom surfaces of bar portion 1108 are relieved (e.g., by machining, etc.) so that cladding 1118 is substantially coplanar with each of surfaces 1110 and 1114. Conventional brazing-filler materials suitable for use in the present invention include, without limitation, aluminum alloys, copper-titanium alloys, steel alloys, and the like. It will be clear to one skilled in the art, after reading this specification, how to specify, make, and use a suitable brazing-filler material. In some embodiments, bar portion 1108 is clad with a material other than a conventional brazing-filler material. Materials suitable for use as cladding on these surfaces include, without limitation, epoxies, thermoset adhesives, metal-filled epoxies, and the like.

Figure 12:
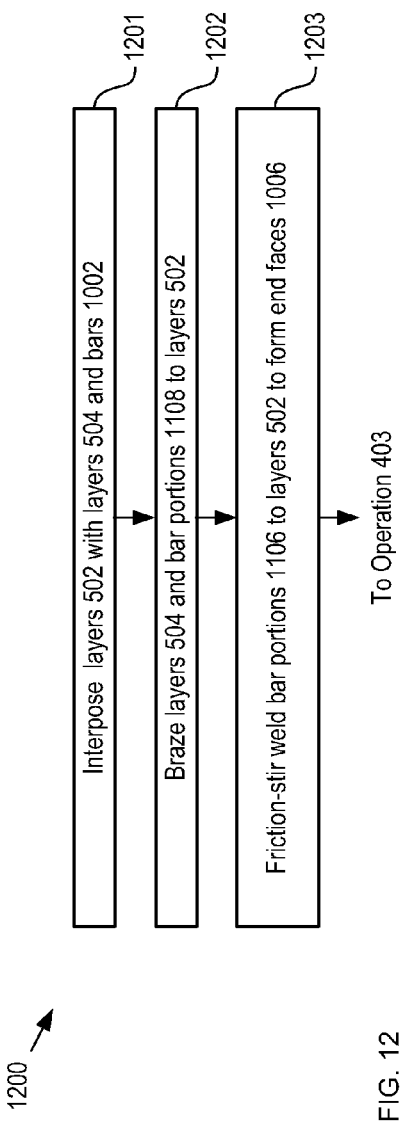
FIG. 12 depicts operations of a method suitable for forming a heat exchanger core in accordance with the second alternative embodiment of the present invention.

FIG. 12 depicts operations of a method suitable for forming a heat exchanger core in accordance with the second alternative embodiment of the present invention. Method 1200 begins with operation 1201, wherein layers 502 and 504 and bars 1002 are arranged in a stack with each adjacent pair of layers 502 interposed by a layer 504 and bar 1002.

At operation 1202, the stack is heated in a brazing oven to join the top and bottom surfaces of each bar portion 1108 to its neighboring layers 502. After operation 1202, the stack of layers 502 and 504 and bars 1002 are a substantially rigid structure.

At operation 1203, each bar portion 1106 and its neighboring layers 502 are joined via friction stir welding to form joints 1004. After operation 1203, each end of core 1000 has a substantially continuous end face 1006, broken only by flow channels 506. In some embodiments, end faces 1006 are planarized by machining their surface (e.g., with an end mill, etc.)

It should be noted that the length of bar portion 1106 along the x-direction is sufficient to ensure that any flow of cladding material from top surface portion 1112 and bottom surface portion 1116 does not encroach significantly onto top surface portion 1110 and bottom surface portion 1114. As a result, incorporation of cladding material into joints 1004 during the friction-stir welding process is avoided. In some embodiments, bars 1002 comprise barriers (e.g., channels, moats, ridges, etc.) for inhibiting the flow of cladding material from top surface portion 1112 and bottom surface portion 1116 onto top surface portion 1110 and bottom surface portion 1114.

Upon completion of operation 1203, method 1200 continues with operations that are analogous to operations 403 through 406 of method 400. It should be noted that, for embodiments in accordance with the second alternative embodiment, face sheets 306-1 and 306-2 can be joined to core 1000 by forming a friction-stir weld only around the perimeter of end face 1006.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A heat exchanger comprising:
    a first core having a first end and a second end, wherein the first core comprises;
        a first layer comprising a first channel having a first channel inlet at the first end and a first channel outlet at the second end for conveying a first fluid from the first channel inlet to the first channel outlet; and
        a second layer comprising a plurality of fins that define a first plurality of second channels, wherein the second layer is brazed to the first layer;
    a first plate disposed at and surrounding the first channel inlet of the first layer of the first core, wherein the first plate and the first layer are joined via a first joint that is a galvanic-corrosion-resistant joint consisting of a same material as the first plate and the first layer; and
    a second plate disposed at and surrounding the first channel outlet of the first layer of the first core, wherein the second plate and the first layer are joined via a second joint that is a galvanic-corrosion-resistant joint consisting of a same material as the second plate and the second layer.

2. The heat exchanger of claim 1 wherein each of the first joint and second joint comprises a friction-stir weld.

3. The heat exchanger of claim 1 wherein the first core further comprises a third layer comprising a third channel having a third channel inlet at the first end and a third channel outlet at the second end for conveying the first fluid, and wherein the second layer interposes the first layer and third layer.

4. The heat exchanger of claim 3 wherein the first core further comprises a first bar having a first portion and second portion, and wherein the first portion is friction-stir welded to each of the first layer and third layer, and further wherein the second portion is brazed to each of the first layer and third layer.

5. The heat exchanger of claim 4 wherein the first core further comprises a second bar having a third portion and fourth portion, and wherein the third portion is friction-stir welded to each of the third layer and the first plate, and wherein the fourth portion is brazed to the third layer.

6. The heat exchanger of claim 1 wherein the first layer extends further along a length of the first core than the second layer, and wherein the first joint is a friction-stir weld.

7. The heat exchanger of claim 1 further comprising a second core, wherein the second core comprises:
    a third layer comprising a third channel having a third channel inlet at the first end and a third channel outlet at the second end for conveying the first fluid from the third channel inlet to the third channel outlet; and
    a fourth layer comprising a plurality of fins that define a second plurality of fourth channels, wherein the fourth layer is brazed to the third layer;
    wherein the first plate is disposed at and surrounding the third channel inlet of the third layer of the second core, wherein the first plate and the third layer are joined via a third joint that is a galvanic-corrosion-resistant joint consisting of a same material as the first plate and the third layer; and
    wherein the second plate is disposed at and surrounding the third channel outlet of the third layer of the second core, wherein the second plate and the third layer are joined via a fourth joint that is a galvanic-corrosion-resistant joint consisting of a same material as the second plate and the fourth layer.

8. The heat exchanger of claim 7
    wherein the first plate comprises a first opening and a second opening, the first opening fluidically coupled with the first channel inlet and the second opening fluidically coupled with the third channel inlet; and
    wherein the second plate comprises a third opening and a fourth opening, the third opening fluidically coupled with the first channel outlet and the fourth opening fluidically coupled with the third channel outlet.

9. The heat exchanger of claim 1 wherein the first layer comprises an extruded channel plate that forms the first channel.

10. The heat exchanger of claim 1 wherein the first joint surrounds the first channel inlet of the first layer of the first core, and the second joint surrounds the first channel outlet of the first layer of the first core.

11. The heat exchanger of claim 1 further comprising a shell defining an interior, the first core and the second core positioned within the interior of the shell.

12. The heat exchanger of claim 1 further comprising a shell defining an interior, the first core positioned within the interior of the shell.

13. A heat exchanger comprising:
    a first core having a first end and a second end, comprising:
        a first plurality of first layers, wherein each of the first plurality of first layers comprises a first channel having a first channel inlet at the first end and a first channel outlet at the second end configured to convey a first fluid from the first channel inlet to the first channel outlet;
        a first plurality of second layers, wherein each of the first plurality of second layers comprises a plurality of fins that define a first plurality of second channels, and wherein each of the first plurality of second layers is brazed to at least one of the first plurality of first layers;
        wherein the first plurality of first layers and the first plurality of second layers are arranged in an alternating stack;
    a first port disposed at the first end of the first core, wherein the first port provides the first fluid to the first core; and
    a first plate disposed at and surrounding the first channel inlets of the first channels of the first plurality of layers, wherein the first plurality of first layers of the first core and the first plate are joined via a first joint that comprises a friction-stir weld devoid of brazing material, and wherein the first plate and first joint collectively define a barrier that fluidically isolates the first port and the first plurality of second layers.

14. The heat exchanger of claim 13 wherein the first core further comprises a first plurality of bars disposed at the first end:
    wherein each of the first plurality of bars has a first portion that is proximal to the first plate and a second portion that is distal to the first plate;
    wherein each of the bars interposes a pair of first layers, and wherein the first portion is friction-stir welded to each of the pair of first layers, and further wherein the second portion is brazed to each of the pair of first layers;

wherein the first plurality of bars and the first plurality of first layers collectively define a first face of the first core; and wherein the first face and the first plate are joined via the first joint.

15. The heat exchanger of claim 13 wherein the first plurality of first layers project beyond the first plurality of second layers at the first end, and wherein each of the plurality of first joints comprise a friction-stir weld.

16. The heat exchanger of claim 15 wherein each of the first plurality of first layers is joined with the first plate such that each of the first plurality of second layers is separated from the first plate by a gap.

17. The heat exchanger of claim 13 further comprising a second core, wherein the second core comprises:

a second plurality of first layers, wherein each of the second plurality of first layers comprises a first channel having a first channel inlet at the first end and a first channel outlet at the second end configured to convey a first fluid from the first channel inlet to the first channel outlet;

a second plurality of second layers, wherein each of the second plurality of second layers comprises a plurality of fins that define a plurality of second channels, and wherein each of the first plurality of second layers is brazed to at least one of the second plurality of first layers;

wherein the second plurality of first layers and the second plurality of second layers are arranged in an alternating stack;

wherein the second core and the first plate are joined via a second joint that comprises a friction-stir weld, and wherein the barrier comprises the second joint, and further wherein the barrier fluidically isolates the first port and the second plurality of second layers.

\* \* \* \* \*